United States Patent Office 3,507,371
Patented Apr. 21, 1970

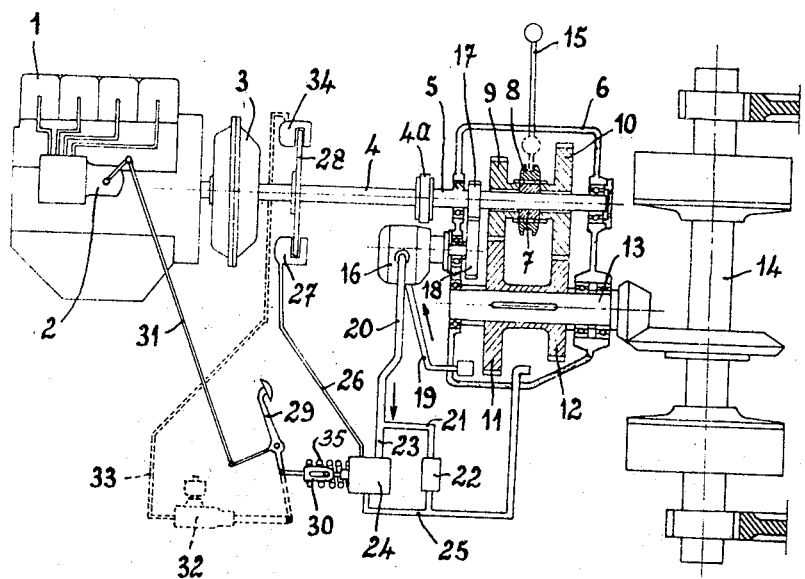

3,507,371
DEVICE TO FACILITATE GEAR CHANGING IN A GEAR BOX PLACED BEHIND A COUPLING MEMBER OF THE HYDROKINETIC TYPE
Paul Pierre Richard, Les Buissonmets, Saint-Cyr-au-Mont-d'Or, Rhone, France, and Jean Louis Joseph Pellat-Finet, Chemin des Ardelets, Saint-Didier-au-Mont-d'Or, Rhone, France
Filed Apr. 2, 1968, Ser. No. 718,173
Claims priority, application France, Apr. 5, 1967, 48,496
Int. Cl. F16d 33/16, 67/04; F16h 47/08
U.S. Cl. 192—3.23        7 Claims

ABSTRACT OF THE DISCLOSURE

A device to facilitate gear-changing in a gear box mounted after an engine and a torque converter, e.g. in a tractor, includes an engine speed regulator, a pump rotatably connected to the output shaft of the torque converter, the flow from the pump being directable to a brake cylinder by a distributor. The brake is connected to the output shaft. The engine regulator is linked through a sliding shackle to the distributor control. Pressure-leakage means is included and may be a separate calibrated valve. When engine speed is reduced by the regulator, the distributor control towards the end of its stroke puts the distributor in the position directing the flow to actuate the brake and thus reduce the torque available on the output shaft. The pressure-leakage ensures a residual flow and hence a small residual rotation of the output shaft suitable for easy and harmless engagement of the gears. A distributor return spring may be includes to ensure prompt return to its initial configuration. An auxiliary disc brake may be linked to the pedal. The pump may serve to lubricate the gear box by its return flow.

---

The present invention relates to a device to facilitate gear changing in a gear box, especially in the case where a torque converter or a hydraulic coupling interposed between the motor and the gearbox is used.

It is well known that the placing in engagement of sliding gears or of dog clutches of a gear box presents certain difficulties due to the fact that the parts (pinions or dog clutches), which must be placed in engagement, must previously be brought to appreciably identical peripheral speeds. In fact, if the parts which must come into contact have very different peripheral speeds, the engagement of the teeth to project into the corresponding notches cannot be effected and, moreover, the contact between those projecting, possessing a relatively high speed, is of a nature to destroy them and cause a disagreeable noise.

It is well known also that a hydrokinetic coupling member such as a torque converter or a coupler driven by a motor, tends to drive its output shaft constantly, in other words that it is susceptible of furnishing to the input shaft of the gear box a driving torque which is not negligible, and even large, of a nature for example of causing the said input shaft of the gear box to turn at a speed in the neighborhood of that of the motor.

It is current practice, in certain machines, especially in certain tractors, to put in gear on stopping the tractor, one or other of the combinatians of the gear box, selected as a function of the work to be carried out. The pinions or dog clutches defining the direction of propulsion towards the front or rear are also and on principle even put in gear when the tractor is immobilized or appreciably immobile. Taking into account what has been set forth previously, it is understood that the engagement of the pinions or dog clutches would be practically impossible if the torque converter or the hydraulic coupler were connected to the input shaft of the box, without other precautions, since it would drive this shaft in rotation, hence certain pinions or dog clutches, although the tractor being immobilized, the other pinions or portions of dog clutches would be immobilized.

To obviate this difficulty, it is current practice to arrange between the converter or hydraulic coupling and the gear box, a clutch enabling the input shaft or main shaft of the box to be disconnected from the output shaft of the converter or hydraulic coupling, in order that the torque produced by these members cannot be applied to the said input shaft of the box and put it in rotation. Sometimes, the clutch is arranged between the motor and the converter or coupling, its effect being identical from the point of view which has been analyzed above. Often, with this clutch is associated a brake, called an inertia brake, suitable for ensuring the arrest of the input shaft, disconnected from the output shaft of the converter or coupler, but which tends to continue to turn, due to the fact of the kinetic energy which it has previously stored. The inertia brake can also be replaced by synchronizers which produce the same effect. It is obvious that the clutch interposed between the torque converter or the hydraulic coupling must be of a size to transmit the maximum torque that the said members can deliver and which constitutes an expensive complication.

It must also be specified that the absolute immobilization of the input shaft of the box by the effect of an inertia brake is not without drawback. In fact, if a relatively considerable rotation of the parts, pinions or dog clutches, which must come into contact is, as previously indicated, such as to destroy or damage these parts, complete immobilization makes their putting into gear difficult, since there exists slight probability that the projecting portions are exactly opposite the notches intended to receive them and, consequently, engagement turns out to be impossible, and can only be realized after numerous attempts. The ideal condition would be that, one of the parts which must be engaged being immobile, the other turns at a very low speed, so that it presents successively, and at low speed, its projecting portions in front of the notched parts of the other part.

It is an object of the present invention to realise this ideal condition.

It is another object to enable in addition, the elimination of the clutch interposed between the output of the converter or coupler and the input of the gear box, or interposed between the motor and the converter or coupler.

According to the invention there is provided a device to facilitate gear-changing in a gear box mounted following an engine and a hydrokinetic member, said device comprising in combination: a control member for the deceleration of the engine and a pump rotatably connected, to an output shaft of the hydrokinetic member, the discharge from said pump being directable by means of a distributor on to a cylinder controlling a brake connected to said shaft, control means for said distributor being cooperatively connected with said engine deceleration control member, and including pressure-leakage means for the discharge from said pump.

According to a preferred embodiment of the invention, this device comprises moreover an auxiliary braking device actuated by the deceleration member of the motor, in proximity to the end of the stroke of the latter enabling modulation of the braking action exerted by the principal brake on the output shaft of the hydrokinetic member.

In order that the invention may be more clearly understood one embodiment of the device according to the invention, is described below, purely by way of nonlimiting example, with reference to the accompanying diagrammatic drawing.

In the drawing, 1 indicates a heat engine furnishing the power necessary for propulsion. This engine is provided with a regulating member 2 controlling its speed.

The engine 1 drives a torque converter or hydraulic coupling 3 of which the output shaft 4 drives the main shaft of the gear box 6; the shafts 4 and 5 are connected for example by a coupling sleeve 4a.

The main shaft or input shaft 5 drives in rotation a dog clutch carrier 7 and a dog clutch ring 8 slidably mounted on the dog clutch carrier 7. In sliding on its dog clutch carrier under the action of a lever 15, the ring 8 can rigidly fix in rotation, at will, the dog clutch carrier 7 and hence the input shaft 5, with one or other of the pinions 9 and 10 mounted loosely on the shaft 5. The pinions 9 and 10 are in permanent engagement, with pinions 11 and 12 respectively, rigidly fixed to the secondary shaft of the box 13 which is connected permanently with the shaft 14 which propels the motive wheels of the vehicle.

In this embodiment, the device comprises a hydraulic pump 16 permanently connected, in rotation, to the input shaft 5, this connection being for example effected by a gear train 17 and 18. This pump may be of any known type, of the gear pump type for example. It is fed with a suitable fluid, for example with oil, even lubricating oil from the gear box 6, of which the casing then acts a reservoir. It draws up this fluid by a tube 18 and delivers by a tube 20. This tube 20 is divided into a tube 21 which enables the return to the reservoir or casing through a suitable discharge valve 22 and a tube 23 connected to a distributor 24. This distributor is arranged to direct at will the fluid issuing from the pump, either to the reservoir casing by a tube 25 or by a tube 26 to a braking cylinder 27 acting on a disc brake 28 rigidly attached to the shafts 4 and 5. The distributor 24 is in addition arranged to connect the brake cylinder 27 to the reservoir when the fluid issuing from the pump 16 is itself returned freely to the reservoir by the tube 25.

The distributor 24 is actuated by a control member 29 shown here as a pedal, and which is connected for the control of the distributor through a sliding shackle 30. Additionally, the control member 29 is connected by a linkage such as 31 to the speed control member at the engine 1.

The operation is as follows:

When the vehicle is stationary, the axle 14, the output shaft 13 of the bear box 6, the pinions or wheels 12, 11, 10 and 9 of the gear box are also stationary. On the contrary, under the effect of the availability of the torque existing on the output shaft 4 of the hydraulic converter or hydraulic coupling, this shaft 4 is driven in rotation, and drives in rotation the input shaft 5 of the gear box and the whole assembly connected permanently to the latter, especially the dog clutch carrier 7, the dog clutch ring 8, as well as the pump 16. In so far as the control member 29 is not actuated, the distributor 24 directs the fluid issuing from the pump 16 into the reservoir or casing and connects also the brake cylinder 27 to the reservoir. From this fact, the brake 28 is not actuated. The engine 1 turns at the speed selected by the driver and which is generally, especially in the case of a tractor, in the region of the speed of maximum power. In this configuration, the engagement of the dog clutches or of the sliding pinions would prove to be impossible or destructive due to the fact that the parts to be engaged are rigidly fixed, some to the shaft 5 in rotation under the effect of the converter or coupler, others to the stationary shaft 13.

By acting on the control member 29, the driver, by means of the linkage 31, acts on the speed regulator 2 and reduces the speed of the engine to a predetermined value. In this first part of its stroke, due to the presence of the sliding shackle 30, the member 29 does not act on the distributor 24, and the only effect produced consists of the reduction to a predetermined value of the speed or rotation of the engine 1. In continuing his action on the member 29, the driver acts on the distributor 24, which has the effect of interrupting the outflow of fluid issuing from the pump 16 through the return tube 25, closing the connection with the reservoir of the brake cylinder 27 and of connecting this brake cylinder 27 to the flow from the pump 16. The fluid issuing from the pump 16 thus causes the gripping of the brake 28.

The deceleration of the engine 1 has the effect of reducing the torque available on the output shaft 4 of the torque converter or of the hydraulic coupling 3. In fact, in the case of such an apparatus of the hydrokinetic type, the torque available on the output shaft 4 is appreciably proportional to the square of the driving speed of the primary element connected to the engine. In decelerating the engine to a speed, for example equal to one third of its rated speed, the maximum torque available at the output shaft 4 is reduced to one-ninth of its maximal value when the engine is operating at full rate. The preliminary deceleration of the engine 1 is therefore essentially of a nature to facilitate the immobilization or slowdown of 4 and 5 by the brake 28.

On the other hand, the pump 16 is rigidly fixed in rotation to the main shaft 5 of the box. It will therefore turn in so far as this shaft 5 continues to turn and due to this fact will emit fluid which will actuate the brake 28. The restraining torque absorbed by the pump 16 therefore adds to the torque furnished by the brake 28 and will contribute to the slowing down of the shaft 5, in being opposed to the reduced motor torque which the hydrokinetic member 3 can supply, after reduction of its driving speed. However, the main shaft 5 will not arrive at complete arrest for if it were immobilized the pump 16 would cease also to turn and would not discharge fluid. In the absence of discharge, the pressure of delivery would fall due to the fact of internal leaks from the pump 16 itself and leaks from the distributor, which can besides be arranged to ensure a systematic leak such that the leak discharge is a function of the pressure, for example by means of a leak orifice calibrated in a manner such that the the discharge is substantially proportional to the pressure which exists in the channels 20 and 26. This function can be ensured by the discharge valve 22 arranged for this purpose.

In practice, a state of equilibrium will be obtained for which the pump 16, hence the shaft 5, will turn at a very low speed such that the discharge from the pump 16 at this speed will compensate exactly for the leaks which correspond to a certain pressure of delivery in the circuits 20–26, hence to a certain restraining torque of the brake 28 and of the pump 16, these torques balancing the motor torque issuing from the hydrokinetic member 3.

All increase in the speed of shaft 5, hence of the pump 16 would involve an increase in discharge of the pump, hence an increase in the pressure of delivery since the growth of the leak discharge postulates an increase in pressure. The increase in pressure involves an increase in the braking couple exerted by the brake 28 tending to reduce the speed of the shaft 5.

Inversely, all tendency to immobilization of the shaft 5 would involve the reduction and even the elimination of the discharge from the pump 16 and the fall in the control pressure of the brake 28, hence the reduction in the restraining torque which would cause immobilization of the shaft 5.

A judicious regulation of the hydraulic members and especially of the leak orifices such as the valve 22 therefore enables the maintenance of the primary assembly of the box connected to the shaft 5 at a low speed suitable to enable the easy engagement of the sliding pinions or of the dog clutches.

In restoring the control member 29 to its initial position the driver causes the resetting of the distributor 24 to its initial position, which has the effect of emptying the brake cylinder 27 and of sending back directly to the reservoir or casing 6 the fluid emitted by the pump 16. It may be advantageous to equip the distributor 24 with a return spring 35 so as to counter-balance in this direction the effect of the sliding shackle 30. Furthermore, in restoring the control member 29 to its initial position, the driver resets the engine 1 to its working speed.

It is to be noted that the pump 16 can serve for the lubrication of the gear box by using the return flow to the casing.

The device described above can be completed by an auxiliary brake control, composed for example of a fluid transmission cylinder 32 connected by a tube 33 to a brake cylinder 34 acting on the brake 28. In acting on the control member 29 and towards the end of the stroke of the said member, the driver adds to the braking torque due to the action of the brake cylinder 27, a supplementary torque due to the action of the cylinder 34 and can thus modulate at will the action of the brake 28 and act on the slight residual speed of the shaft 5 by causing a more or less rapid or more or less considerable slowing down of this shaft. This auxiliary braking can also enable a defective operation of the principal system to be obviated.

The brake is shown at 28 as a disc brake but it can be of any other known type.

As goes without saying and as appears from the foregoing, the invention is not limited to the embodiment of this device which has been described above; it embraces, on the contrary, all variants of execution.

For example, it is obvious that the gear box may comprise several dog clutches such as 8 and that certain of the combinations obtained can reverse the direction of propulsion of the vehicle, without changing the principle of the invention.

It would be the same, if the wheels 9 and 10 being rigidly fixed permanently to the shaft 5, the dog clutch were arranged on the output shaft 13 to fix this shaft 13 at will with the pinions 11 and 12 mounted, in this case, loose on the said shaft 13.

The principle of the device according to the present invention would not be modified if the system of engagement of the gears by dog clutches were replaced by the conventional system of sliding pinions, in which case the action of the lever 15 would have the effect of causing the pinions 9 and 10 to slide on the shaft 5 to bring them into engagement with the pinions 11 and 12 fastened on the secondary shaft 13.

All these and other changes and modifications are to be regarded as within the scope of the invention.

We claim:

1. A device to facilitate gear-changing in a gear box mounted downstream of an engine and a hydrokinetic member, the latter having a driven output shaft, said device comprising: an engine deceleration control member, a pump rotatably connected to the output shaft of the hydrokinetic member, a brake connected to said output shaft, a cylinder coupled to the brake to operate the same, a distributor capable of directing the flow from said pump to said cylinder, distributor control means cooperatively connected to said engine deceleration control member and to said distributor, and including pressure-leakage means for selectively diverting said flow to said cylinder; and an auxiliary braking device coupled to the shaft and actuated by and in proximity to the end of the stroke of the engine deceleration control member, thereby enabling modulation of the braking action exerted by the said brake on the output shaft of the hydrokinetic member.

2. A device according to claim 1, wherein the gear box has an enclosing casing and said pump is connected to the casing to provide return flow to the casing for the lubrication of the gear box.

3. A device according to claim 1, wherein said pressure-leakage means comprises a discharge valve which effects the diverting of the flow as a function of the pressure issuing from the pump and actuating the brake.

4. A device according to claim 1, wherein said distributor control means comprises a sliding shackle.

5. A device according to claim 1, wherein said distributor control means comprises a return spring to ensure the prompt return of the distributor to its initial confiigurration.

6. A device according to claim 1, wherein said brake is a disc brake.

7. A device according to claim 1, wherein said auxiliary braking device is a disc brake.

References Cited

UNITED STATES PATENTS

| 2,073,357 | 3/1937 | Wemp | 192—3.34 X |
| 2,102,755 | 12/1937 | Sinclair | 192—3.23 X |
| 2,309,051 | 1/1943 | Dodge | 192—3.23 X |
| 2,726,556 | 12/1955 | Greenlee | 192—3.23 X |
| 2,797,780 | 7/1957 | Wemp. | |

MARK NEWMAN, Primary Examiner

U.S. Cl. X.R.

74—645, 846; 188—152; 192—3.24, 3.34